Sept. 14, 1926.

O. W. BRENIZER

TOGGLE BOLT

Filed March 6, 1925     2 Sheets-Sheet 1

1,600,034

INVENTOR

Orson W. Brenizer

Sept. 14, 1926.
O. W. BRENIZER
TOGGLE BOLT
Filed March 6, 1925
1,600,034
2 Sheets-Sheet 2
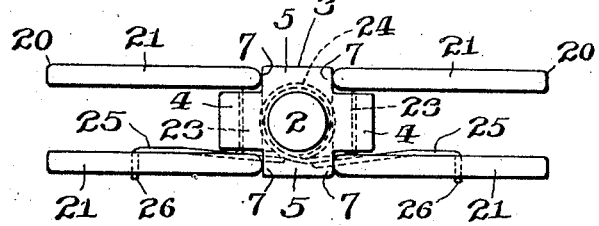
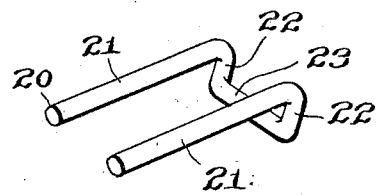
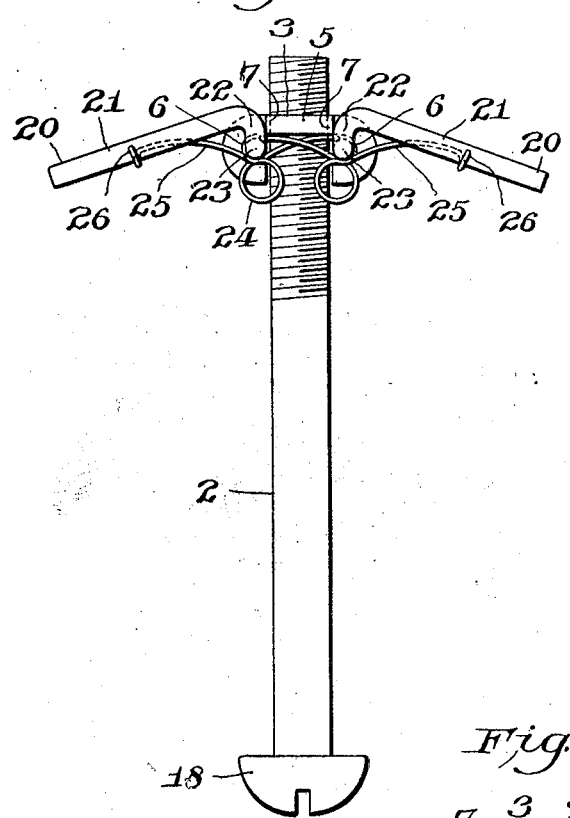
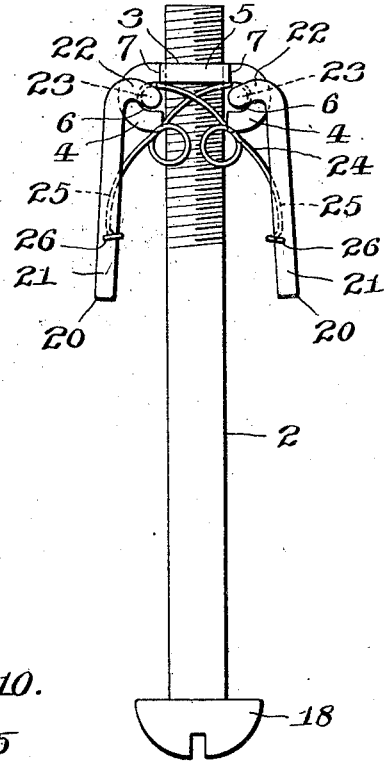
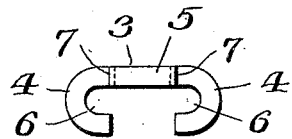
INVENTOR
Orson W. Brenizer Patented Sept. 14, 1926.

1,600,034

UNITED STATES PATENT OFFICE.

ORSON W. BRENIZER, OF PHILADELPHIA, PENNSYLVANIA, ASSIGNOR TO J. EDWARD OGDEN, OF MOUNTAINVILLE, NEW YORK.

TOGGLE BOLT.

Application filed March 6, 1925. Serial No. 13,499.

This invention relates to improvements in that class of toggle bolts wherein, as generally stated, two anchoring wings are pivoted on a head which is either in threaded engagement with the body of the bolt to act as a nut thereon or secured thereto or formed integral therewith and in which yielding means is provided to move the wings outwardly into an expanded or anchoring position.

The invention is characterized by the employment of two anchoring wings which are pivotally connected to the head on separate axes on opposite sides of the body of the bolt, and its object is to provide a device of novel construction which may be manufactured at low cost and which will be efficient when in service; and a further object of the invention is to so combine and arrange the parts of the device that the head will be in such threaded engagement with the body of the bolt proper that it may pass between the anchoring wings and through and beyond the head which carries them.

Toggle bolts constructed in accordance with the invention are adapted to be used as a securing means for attaching objects to walls, ceilings and the like in cases where only one of two opposite surfaces of a wall is convenient of access, the wings being adapted to be passed through a hole in the wall and thereafter to prevent the withdrawal of the bolt from the hole as will hereinafter more fully appear.

With the aforesaid and related objects in view, the invention consists of the elements and the combinations of them hereinafter described and claimed.

In the accompanying drawings, illustrating the invention,

Figures 6, 7, 8, 9 and 10 are views similar to Figs. 1, 2, 3, 4 and 5, but showing another form of embodiment of the invention.

Figure 3:
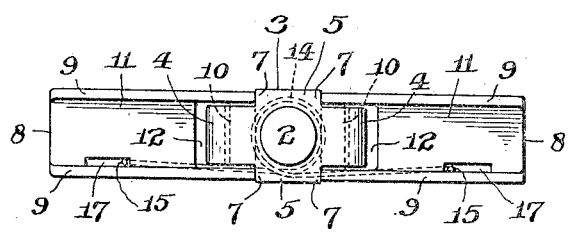
Figure 3 is a top view of the toggle bolt.
Figure 4:
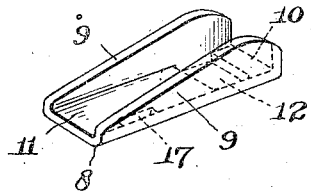
Figure 4 is a perspective view of one of the anchoring wings.

Referring to the drawings, 2 designates the body of the bolt or the bolt proper which I shall herein term the bolt, and 3 designates a wing carrying head which may be associated with the bolt 2 in any suitable manner. As herein illustrated, the bolt 2 is screw-threaded and the head 3 is provided with a central opening which is threaded to fit the threads of the bolt, and the head is screwed on to the bolt so that either the bolt or the head may be turned relatively to the other, and so that the head will act as a nut upon the bolt.

The head 3 is formed of a cross-shaped punching of sheet metal providing two pairs of outwardly projecting arms 4, 4 and 5, 5. The arms 4, 4 are turned downwardly and inwardly to form hooks and provide enclosures 6, 6 which will be presently referred to; and the arms 5, 5 provide shoulders 7, 7, 7 and 7 which form abutments for the anchoring wings hereinafter described.

I shall now describe the anchoring wings 8, 8 shown in Figs. 1, 2, 3 and 4.

Each wing 8 is formed of a single piece or punching of sheet metal bent to form spaced, parallel side members 9, 9 and connecting members 10 and 11 separated by an opening 12. The wings 8, 8 are pivotally connected to the heads 3 by having their connecting members 10, 10 confined within the enclosures 6, 6 provided by the hooks or arms 4, 4, so that the wings may swing on their pivotal members 10, 10 inwardly from the expanded position shown in Fig. 1 to the contracted position shown in Fig. 2, and back again or outwardly from the position shown in Fig. 2 to the position shown in Fig. 1.

The wings 8, 8 embrace the arms 4, 4 of the head 3, confining the arms 4, 4 between the side members 9, 9, 9, 9 of the wings so that the opposing surfaces of the arms and the embracing side members prevent lateral displacement of the wings. The inner ends of the side members 9, 9, 9, 9 are adapted to engage the abutments or shoulders 7, 7, 7, 7 of the member 3 and arrest the outward movement of the wings 8, 8 in the position shown in Fig. 1.

Figure 1:
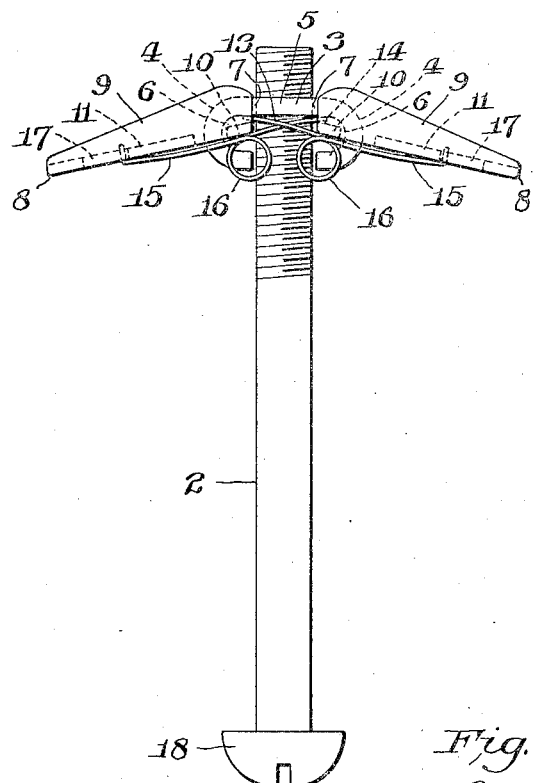
Figure 1 is a side view of a toggle bolt showing one form of embodiment of my invention with the anchoring wings in the open or expanded position.

The wings 8, 8 are held normally in the expanded position shown in Fig. 1 by a spring 13 which is formed of wire and has its central portion bent to form a ring or loop 14 surrounding the bolt and which has its end portions formed into arms 15, 15 which cross each other and extend outwardly beneath the wings and engage the bottoms thereof. The spring arms 15, 15 have loops 16, 16 formed therein to increase the resiliency thereof, and the outer end portions of the spring arms are turned upwardly and enter slots 17, 17 in the wings 8, 8 to prevent lateral displacement of the arms.

Figure 2:
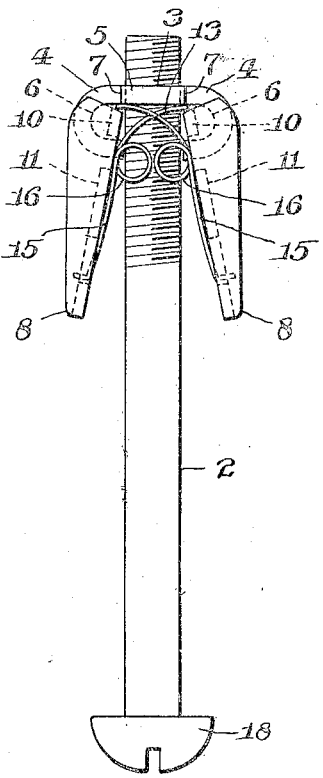
Figure 2 is a side view thereof with the anchoring wings in the contracted position.
Figure 5:
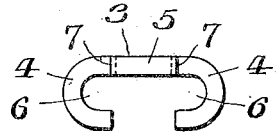
Figure 5 is a side view of the wing carrying head detached from the body of the bolt.

The spring arms 15, 15 press the wings 8, 8 against the shoulders 7, 7, 7, 7 and hold them normally in the expanded position shown in Fig. 1, and permit the wings to be moved against the resilient action of the spring to or toward the contracted position shown in Fig. 2. After the wings have been moved to or toward the position shown in Fig. 2, and subsequently released, the spring 13 will automatically return the wings to the expanded position shown in Fig. 1.

It will now be understood that the end portion of the bolt carrying the wings 8, 8 may be passed through a hole in a wall of less diameter than the space between the outer ends of the wings, and that as the wings are passed through the hole they will engage the wall thereof and be thereby moved toward or to the contracted position shown in Fig. 2 against the resilient action of the spring 13; and that, after the wings 8, 8 clear the hole, they will be automatically expanded into the position shown in Fig. 1 in which they will engage the wall and prevent the withdrawal of the head 3 and wings 8, 8 through the hole. This done the bolt 2 may be tightened by screwing it on through the head 3 to secure any desired object in place between the wall and the bolt head 18.

In assembling the parts of the device, the central loop 14 of the spring 13 is first placed between the arms or hooks 4 of the head 3 and in registry with the central opening in the head 3 and against the central portion of the head. The connecting members 10, 10 of the wings 8, 8 are then passed between the free ends of the hooks or arms 4, 4 and inserted into the hooks or enclosures formed thereby, the spring arms 15, 15 being sprung outward slightly to permit the members 10, 10 to enter the hooks. This done the arms 15, 15 are sprung under the wings 8, 8 and the upturned free ends of the arms 15, 15 are inserted into the slots 17, 17.

I shall now describe the anchoring wings 20, 20 shown in Figs. 6, 7, 8 and 9.

Each wing 20 is formed of a single piece of relatively stiff wire bent to form spaced, parallel side members 21, 21 having shoulder portions 22, 22 and a transversely extending connecting member 23. The wings 20, 20 are pivotally connected to the head 3 by having their connecting members 23, 23 confined within the enclosures 6, 6, so that the wings 20, 20 may swing on their pivotal members 23, 23 inwardly from the expanded position shown in Fig. 6 to the contracted position shown in Fig. 7 and back again.

The shoulder portions 22, 22, 22, 22 of the wings 20, 20 are adapted to engage the abutments 7, 7, 7, 7 of the head 3 to arrest the outward movement of the wings in the expanded position shown in Fig. 6.

A spring 24 is provided to hold the wings 20, 20 normally in the expanded position and to automatically return them thereto after they have been moved to or toward the contracted position shown in Fig. 7 and released; and the spring 24 is related to the bolt 2 and wings 20, 20 the same as the spring 13 is related to the bolt and wings 8, 8, excepting that the free ends of the arms 25, 25 of the spring 24 are provided with hooks 26, 26 which embrace and engage the lower portions of side members 21, 21 of the wings 20, 20.

Excepting as hereinbefore described, the parts of the wings 20, 20 are related to the parts of the head 3 and bolt 2 the same as the parts of the wings 8, 8 are related thereto, and in passing the device having the wings 20, 20 through a hole in a wall the parts operate substantially the same as the parts of the device shown in Figs. 1 to 5, inclusive. An advantage due to the character of the wings 20, 20 is that if the opposing surface of the wall which is engaged by the free ends of the members 21, 21, 21, 21 of the wings is uneven, so that, when the bolt is tightened, one or more of the free ends of the members 21 engage the opposing surface in advance of one or more of the others, the wings 20 will yield until all or nearly all of the free ends of the members engage the opposing surface, thus increasing the resistance of the wings to the tightening action of the bolt, as more members 21 come into play, and providing a resilient grip for the clamping action of the bolt in securing an object to a wall. The wire forming the wings 20, 20 is sufficiently stiff to provide the required resistance for practical purposes and yet it has sufficient resilience to permit the action above described.

I claim as my invention:—

1. The combination of a bolt, a head thereon, two anchoring wings pivotally connected to the head on separate axes on opposite sides of the bolt, the bolt being in threaded engagement with the head and adapted to pass freely through it and between the wings, a spring having a plurality of loops therein, its central portion arranged between the wings and its end portions extending outwardly and engaging the wings to move them outwardly, and means to arrest the outward movement of the wings.

2. The combination of a bolt, a head thereon, two anchoring wings arranged on opposite sides of the bolt, the head and the wings having integral interprojecting parts pivotally connecting the wings to the head on separate axes on opposite sides of the bolt, yielding means to move the wings outwardly, and means to arrest the outward movement of the wings.

3. The combination of a bolt, a head thereon, two anchoring wings arranged on opposite sides of the bolt, and yielding means to move the wings outwardly, said head having parts on opposite sides thereof projecting outwardly in opposite directions between the wings and forming stops to arrest the outward movement of the wings.

4. The combination of a bolt, a head thereon, two anchoring wings arranged on opposite sides of the bolt, a spring having its central portion embracing the bolt and its end portions crossing each other and engaging the wings to move them outwardly, and means to arrest the outward movement of the wings.

5. The combination of a bolt, a head thereon having outwardly projecting, inturned arms forming enclosures on opposite sides of the bolt, two anchoring wings having parts confined within said enclosures and pivotally connecting them to said head, yielding means to move the wings outwardly, and means to arrest the outward movement of the wings.

6. The combination of a bolt, a head thereon having outwardly projecting, inturned arms forming enclosures on opposite sides of the bolt, two anchoring wings having parts confined within said enclosures and pivotally connecting them to said head, and yielding means to move the wings outwardly, said head having parts on opposite sides thereof projecting outwardly between the wings and forming stops to arrest the outward movement of the wings.

7. The combination of a bolt, a head thereon, an anchoring wing formed of a single piece of metal bent to form side members and a connecting member, the connecting member being embraced by a part of the head to pivotally connect the wing to the head, yielding means to move the wing outwardly, and means to arrest the outward movement of the wing.

8. A wing carrying head for toggle bolts, formed of a cross shaped piece of sheet metal, two opposite arms of which are bent to form wing receiving hooks and the two remaining arms of which are adapted to act as abutments for wings carried by the hooks.

9. A wing-carrying head for toggle bolts, formed of a piece of sheet metal having a central opening to receive a bolt and having two opposite arms bent to form wing receiving hooks.

10. The combination of a bolt, a head thereon, an anchoring wing pivotally connected to the head and comprising two spaced side members and a connecting member, the side members having free end portions projecting away from the connecting member and away from the head and constructed to yield under pressure relatively to one another, yielding means to move the wing outwardly, and means to arrest the outward movement of the wing.

11. The combination of a bolt, a head thereon, an anchoring wing pivotally connected to the head and formed of a single piece of wire bent to form a connecting member and two spaced side members extending therefrom, yielding means to move the wing outwardly, and means to arrest the outward movement of the wing.

12. The combination of a bolt, a head thereon, an anchoring wing pivotally connected to the head and formed of a single piece of wire bent to form a connecting member and two spaced side members extending therefrom and having shoulder portions adapted to engage the head and arrest the outward movement of the wing, and yielding means to move the wing outwardly.

13. The combination of a bolt, a head thereon having outwardly projecting, inturned arms forming enclosures on opposite sides of the bolt, two anchoring wings each formed of a single piece of wire bent to form a connecting member and two spaced side members extending therefrom, the connecting members being confined within said enclosures and pivotally connecting the wings to the head, yielding means to move the wings outwardly, and means to arrest the outward movement of the wings.

14. The combination of a bolt, a head thereon, two anchoring wings pivotally connected to the head, each wing being formed of a single piece of wire bent to form a connecting member and two spaced side members extending therefrom and having shoulder portions, said head having parts on opposite sides thereof between the wings adapted to be engaged by said shoulder portions thereby to arrest the outward movement of the wings, and yielding means to move the wings outwardly.

15. The combination of a bolt, a head thereon having outwardly projecting, inturned arms forming enclosures on opposite sides of the bolt, two anchoring wings each formed of a single piece of wire bent to form a connecting member and two spaced side members extending therefrom and having shoulder portions, the connecting members being confined within said enclosures and pivotally connecting the wings to the head, said head having parts on opposite sides thereof projecting outwardly between the shoulder portions of one wing and the shoulder portions of the other wing and adapted to be engaged by the shoulder portions to arrest the outward movement of the wings, and yielding means to move the wings outwardly.

In testimony wherof I affix my signature hereto.

ORSON W. BRENIZER.